(12) United States Patent
Komatsu et al.

(10) Patent No.: US 6,373,730 B1
(45) Date of Patent: Apr. 16, 2002

(54) SWITCHING POWER SUPPLY

(75) Inventors: Akeyuki Komatsu; Nobutake Yamaichi, both of Saijo (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/647,077

(22) PCT Filed: Aug. 2, 1999

(86) PCT No.: PCT/JP99/04175

§ 371 Date: Feb. 9, 2001

§ 102(e) Date: Feb. 9, 2001

(87) PCT Pub. No.: WO00/44085

PCT Pub. Date: Jul. 27, 2000

(30) Foreign Application Priority Data

Jan. 22, 1999 (JP) .............................................. 11-013855

(51) Int. Cl.⁷ .............................. H02M 1/12; H02M 3/24
(52) U.S. Cl. ............................................ 363/41; 363/98
(58) Field of Search ............................... 363/41, 37, 98, 363/132, 25, 16, 89, 134

(56) References Cited

U.S. PATENT DOCUMENTS 4,864,589 A * 9/1989 Endo ........................... 375/141
5,590,033 A * 12/1996 Kawano ...................... 363/25

FOREIGN PATENT DOCUMENTS

| JP | 62-114469 | 5/1987 |
| JP | 8-340675 | 12/1996 |

* cited by examiner

*Primary Examiner*—Rajnikant B. Patel
(74) *Attorney, Agent, or Firm*—Rossi & Associates

(57) ABSTRACT

A switching power supply has a switching circuit for supplying a predetermined output voltage regardless of load variations and converting input voltages into the predetermined output voltage; pulse width control circuit for controlling the switching circuit; a circuit for detecting load power; and an oscillation frequency variable oscillation circuit. Such arrangement can change the switching frequencies and prevent a decrease in efficiency under low load.

2 Claims, 5 Drawing Sheets

FIG. 4
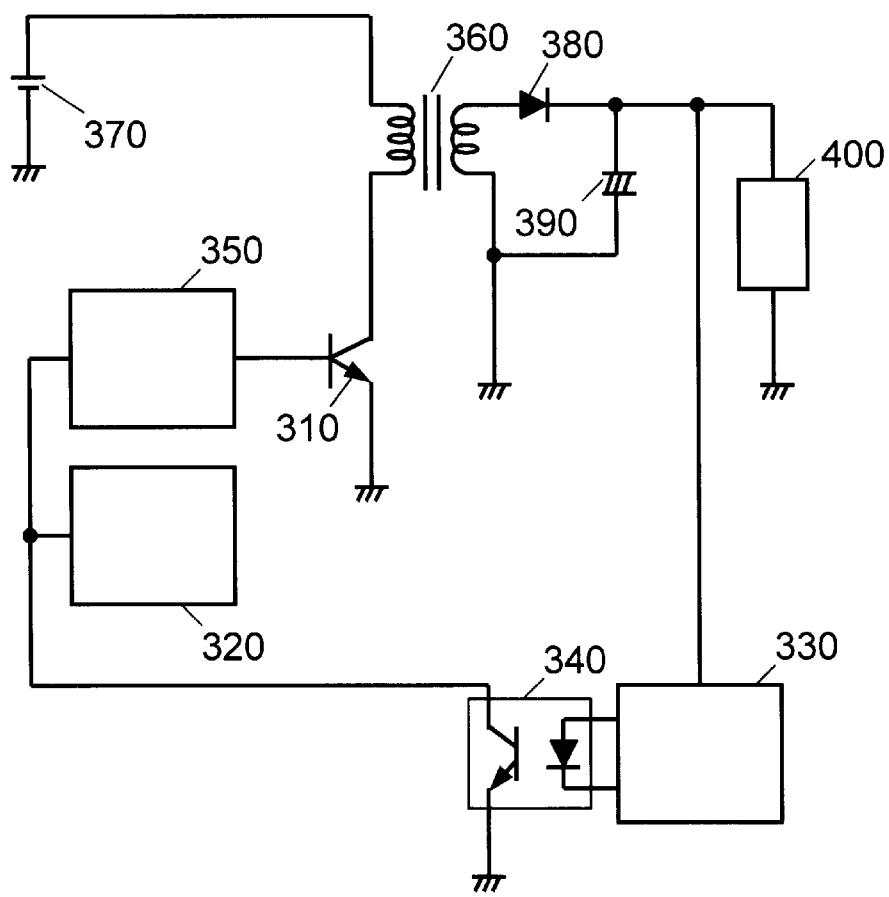
FIG. 5A  Voltage  Current
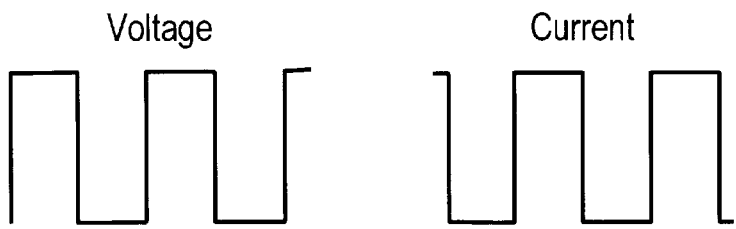
FIG. 5B  Voltage  Current
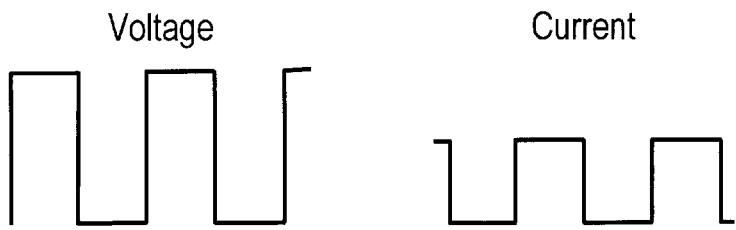

SWITCHING POWER SUPPLY

FIELD OF THE INVENTION

This invention relates to a switching power supply characterized by minimizing a decrease in efficiency when load power is decreased, i.e. Minimizing switching loss under low load.

BACKGROUND OF THE INVENTION

FIG. 4 shows a circuit diagram of a switching power supply of this type in accordance with a conventional technique.

In FIG. 4, switching element 310 switches and converts DC input voltages into AC voltages and provides stable output voltages to output transformer 360 to the secondary side of this transformer 360. Pulse width modulation (PWM circuit 320 controls the ON/OFF state of switching element 310 according to a feedback amount obtained by the detection of output voltages. Output voltage detection circuit 330 detects output state and feeds a signal back to the primary side of transformer 360 so that the output voltages are decreased when they are above a predetermined value and the output voltages are increased when they are below the predetermined value.

Photo coupler 340 is provided for the above-mentioned feedback purpose and transmits the signal obtained from output voltage detection circuit 330 to PWM circuit 320 on the primary side. Frequency variable oscillation circuit 350 changes oscillation frequencies according to feedback current so that the oscillation frequencies decrease at load power below a predetermined value and they increase at load power above the predetermined value. The primary side of transformer 360 is connected to power supply 370. Connected to the secondary side of transformer 360 are rectifier diode 380, rectifying capacitor 390, and load 400.

The conventional switching power supply configured as above controls switching frequencies by increasing or decreasing them according to the feedback amounts that vary with changes in output voltages whether they are above or below the predetermined value. This feedback amount is closely related to the period of time during which transistor 310 conducts (hereinafter referred to as "ON-time") that is determined by output voltage. Load power of the switching power supply is expressed by the equations shown below, where the ON-time of transistor 310 is $T_1$, the input voltage is Vi, the output voltage is Vo, the period of time during which the back electromotive force of output transformer 360 is generated (hereinafter referred to as "back electromotive generation time") is T2, the inductance of the transformer is L, the oscillation frequency is F, and the load power is P.

First, when the load power is above a critical current, i.e. when the load power is large, the transformer carries continuous current and the following equations hold:

$$Vi \times T_1 = Vo \times T_2 \quad (1)$$

$$F = 1/(T_1 + T_2) \quad (2)$$

When the load power is below this critical current and oscillation frequency F is constant, pulse widths $T_1$ and $T_2$ change with the crest values of the output and input voltages of the transformer windings. The crest value of the transformer output voltage is equal to that of the output voltage and the crest value of the transformer input voltage is equal to that of the input voltage. Direct current does not develop through the transformer windings.

Therefore, $Vi \times T_1 - Vo \times T_2 = 0$, i.e. $Vi \times T_1 = Vo \times T_2$, holds theoretically. Changes in power will not cause changes in pulse width; and when the frequency is constant, pulse widths $T_1$ and $T_2$ only relate to input voltage Vi and output voltage Vo and do not relate to load power P.

Consequently, as indicated by the waveforms generated under load above the critical current, as shown in FIGS. 5A and 5B, load power P has no relation with feedback amount ($T_1$, $T_2$). FIG. 5A shows a waveform generated when the load is large and FIG. 5B shows a waveform generated when the load is small. The difference between them is only the current waveform.

When the load power is below the critical current, i.e. when the load current is small and the transformer does not carry continuous current, the following equations hold:

$$P = (\tfrac{1}{2}) \times F \times T_2^2 \times Vo^2 / L \quad (3)$$

$$P = (\tfrac{1}{2}) \times F \times T_1^2 \times Vi^2 / L \quad (4)$$

$$Vi \times T_1 = T_2 \times Vo \quad (5)$$

where equation (3) is based on the output voltage of the transformer seen from the output side and equation (4) is based on the input voltage of the transformer seen from the input side, and equation (5) shows a relation among input and output voltages and pulse widths.

Like these, equation (4) shows that output power P relates to the square of input voltage Vi, when oscillation frequency F and inductance L of the transformer are constant, and the feedback amount corresponding to ON-time $T_1$ of the transistor is also constant.

Frequency control based on a feedback amount starts when the feedback amount is a predetermined value, i.e. when the feedback amount corresponding to ON-time $T_1$ of transistor 310 is constant. Therefore, when input voltage Vi is low, the frequency control starts at low power; and when input voltage Vi is high, the frequency control starts at high power. Voltage waveforms generated when the load is below the critical current are shown in FIGS. 6A and 6B. FIG. 6A shows a case where the frequency control starts at high power when the input voltage is high and $T_1$ is constant. FIG. 6B shows a case where the frequency control starts at low power when the input voltage is low.

The above-mentioned switching power supply has the following problem.

In a conventional switching power supply, load power P is obtained by the detection of a feedback amount. The feedback amount varies with output voltage Vo and input voltage Vi, when the load power is constant,. i.e. P in equation (3) is constant. Furthermore, when load power P and output voltage Vo are constant, i.e. output voltage Vo and pulse width $T_2$ are constant, the feedback amount varies with input voltage Vi.

For this reason, when the frequency control based on a constant feedback amount is performed, since load power P is proportional to the square of input voltage Vi, the load power at which the frequency control starts is proportional to the square of input voltage Vi although such load power should be constant. Therefore, the frequency control is not performed at the load power determined ideal for starting it. Voltage waveforms generated when the load is below a critical current, $T_2$ is constant, and input voltage Vi is different are shown in FIGS. 7A and 7B. As shown in FIG. 7A, when input voltage Vi is high, the frequency control starts at high load power; and as shown in FIG. 7B, when input voltage Vi is low, the frequency control starts at low load power. This has been the problem.

SUMMARY OF THE INVENTION

In order to address the above-mentioned problem, this invention aims to lower the switching frequency to a predetermined value at load power less than a predetermined value by detecting pulse waveforms of the output transformer, and to perform pulse width control when the frequency has been lowered to the predetermined value.

The load power under low load is closely related to the pulse width of the output transformer as shown by equation (4). Thus, detecting the pulse width from the pulse waveform of the voltage of the transformer winding provides the load power; and when the load is below a predetermined value, lowering the switching frequency will minimize a decrease in efficiency under low load.

As mentioned above, the present invention allows stable detection of predetermined load power regardless of variations of input voltages and improves power supply efficiency in a stable manner at load power below a predetermined value. At load power above the predetermined value, stable output can be supplied with the original power supply operation.

BRIEF DESCRIPTION OF THE DRAWINGS

FIG. 4 shows a circuit diagram of a conventional switching power supply;

FIGS. 5A and 5B are waveforms showing the operation of the power supply;

PREFERRED EMBODIMENTS OF THE INVENTION

Exemplary embodiments of the present invention are described hereinafter with reference to the accompanying drawings.

First Embodiment

Figure 1:
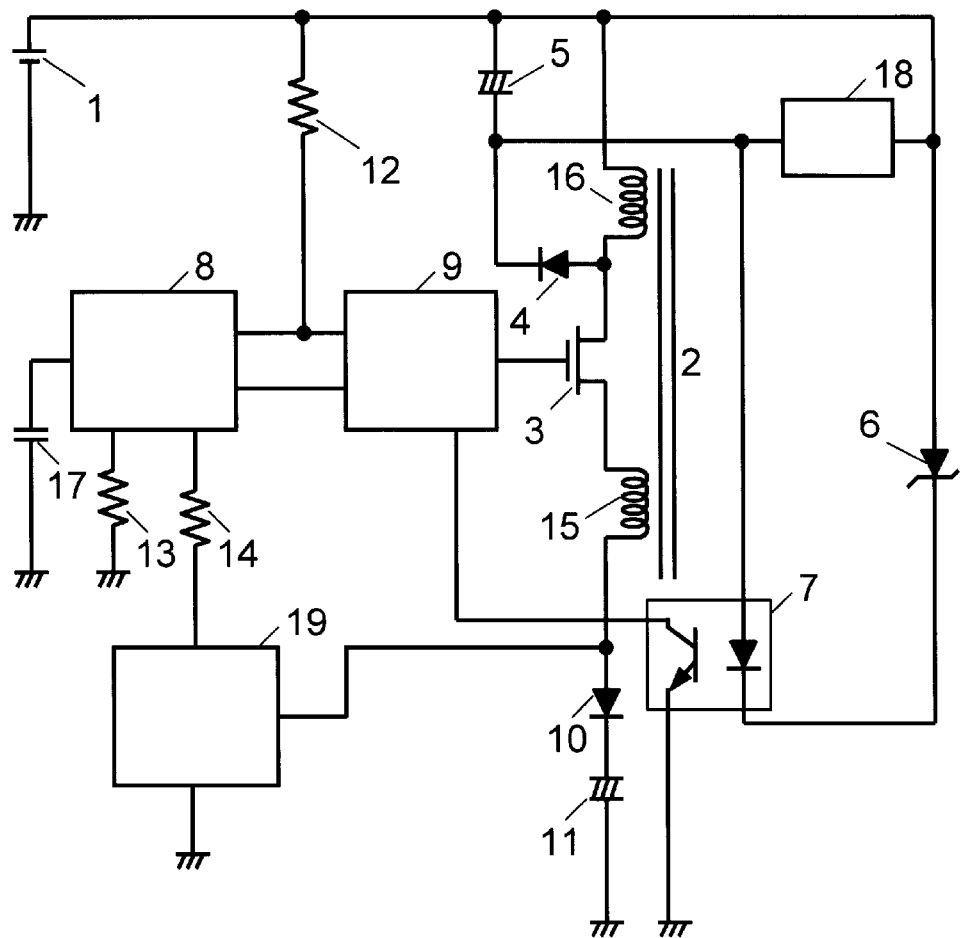
FIG. 1 shows a circuit diagram of a switching power supply in accordance with a first exemplary embodiment of the present invention.

FIG. 1 shows a circuit diagram of a switching power supply in accordance with the first embodiment.

In FIG. 1, the other terminal of DC power supply 1 whose one terminal is grounded is connected to one terminal of auxiliary winding 16 of output transformer 2. The other terminal of auxiliary winding 16 is connected to one output terminal of switching element 3. The other output terminal of switching element 3 is grounded via primary winding 15 of transformer 2, rectifier diode 10, and rectifying capacitor 11. One terminal of oscillating capacitor 17 whose other terminal is grounded is connected to frequency variable oscillation circuit 8. One terminal of minimum frequency determining resistor 13 whose other terminal is grounded is connected to frequency variable oscillation circuit 8. The output of frequency variable oscillation circuit 8 is connected to pulse width modulating PWM circuit 9. The output of PWM circuit 9 is connected to the input terminal of switching element 3. Between the node of frequency variable oscillation circuit 8 and PWM circuit 9 and the other terminal of power supply 1, resistor 12 is connected.

The other terminal of auxiliary winding 16 is connected to the other terminal of power supply 1 via rectifier diode 4 and rectifying capacitor 5. The cathode of rectifier diode 4 is connected to the other terminal of power supply 1 via load resistor 18. One terminal of output voltage detecting circuit 6 comprising a voltage regulation diode is connected to one terminal of load resistor 18, i.e. the other terminal of power supply 1. The other terminal of load resistor 18 is connected to the other terminal of output voltage detecting circuit 6 via a photo-diode in feedback photo coupler 7. As for a phototransistor in photo coupler 7, its emitter is grounded and its collector is connected to PWM circuit 9. The anode of rectifier diode 10 is connected to load power detecting circuit 19 whose one terminal is grounded. Between frequency variable oscillation circuit 8 and load power detecting circuit 19, frequency control resistor 14 is connected.

The switching power supply with the above arrangement of the first embodiment is structured to have a pulse width detecting circuit in windings of output transformer 2, i.e. primary winding 15 and auxiliary winding 16; and the output of the pulse width detecting circuit is connected to frequency variable oscillation circuit 8. When the period of time during which back electromotive force is generated in output transformer 2 is not greater than a predetermined value, the oscillation frequency of oscillation circuit 8 is lowered. Such an arrangement eliminates insulation on primary and secondary sides of the transformer that has been necessary in the conventional arrangement shown in FIG. 4, thus allowing the structure of switching power supply to be simplified.

Next, its operation is described.

In FIG. 1, DC power supply 1 supplies input power. Output transformer 2 converts output voltages from primary winding 15 side to auxiliary winding 16 side. Switching element 3 converts input DC current to AC current. Rectifier diode 4 converts AC current to DC current. Rectifying capacitor 5 smoothes and converts the pulsating DC current converted by rectifier diode 4 to stable DC current. Output voltage detecting circuit 6 detects output voltages. Photo coupler 7 feeds error signals detected by output voltage detecting circuit 6 back to the primary side. Frequency variable oscillation circuit 8 can change oscillation frequencies according to external signals. PWM circuit 9 controls pulse widths according to the feedback amount. Minimum frequency determining resistor 13 prevents an excessive decrease in frequency. Frequency control resistor 14 controls frequencies and also restricts the maximum frequency. Load power detecting circuit 19 detects load power according to back electromotive force generation time $T_2$ of the output waveform of auxiliary winding 16. A waveform analogous to that of primary winding 15 is supplied to auxiliary winding 16. Load power detecting circuit 19 detects back electromotive force generation time $T_2$ in the pulse waveform of primary winding 15. When black electromotive force generation time $T_2$ is not greater than a predetermined value, the switching power supply controls the frequencies of frequency variable oscillation circuit 8 so as to lower them from the maximum one to the minimum one according to its load conditions.

Frequency variable oscillation circuit 8 is configured so that it can be set to a predetermined operating frequency. This operating frequency is determined by oscillating capacitor 17, minimum frequency determining resistor 13, and frequency control resistor 14 that are connected to frequency variable oscillation circuit 8.

At low load power, the frequency is lowered according to the signals detected by load power detecting circuit 19 and the operating frequency is determined by the current flowing through frequency control resistor 14. Moreover, the frequency is restricted below a value determined by frequency control resistor 14. Frequency variable oscillation circuit 8 is also configured so that the frequency is maintained above the predetermined value even when it is sufficiently lowered. In other words, even when load power detecting circuit 19 operates and the current through frequency control resistor 14 is lowered to zero, the minimum frequency is restricted by minimum frequency determining resistor 13.

Moreover, frequency variable oscillation circuit 8 is configured so as to control output voltages in a stable manner. That is, the pulse width control restricts output pulse when load power is so decreased that output voltages are made high, regardless of whether load power detecting circuit 19 controls to lower oscillation frequencies to a predetermined value or load power decreases and the frequency control suppresses output voltages.

Figure 2:
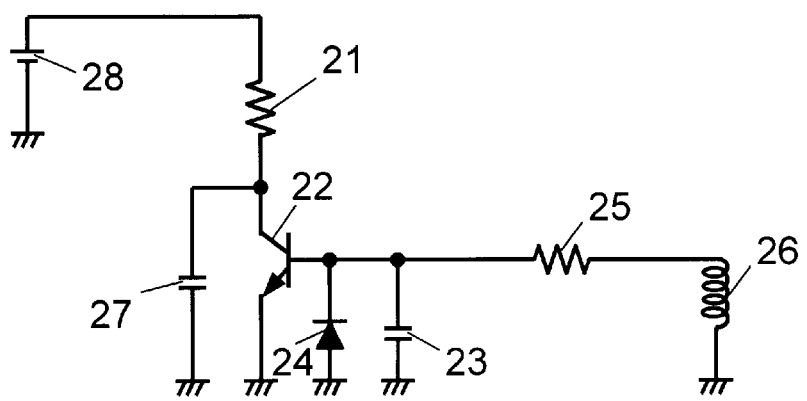
FIG. 2 shows a circuit diagram of a load power detecting circuit in the switching power supply.

FIG. 2 shows a detailed example of load power detecting circuit 19.

In FIG. 2, one terminal of power supply 28 whose other terminal is grounded is connected to the collector of transistor 22 via load resistor 21. One terminal of capacitor 27 whose other terminal is grounded is connected to the collector. The emitter of the above transistor 22 is grounded and its base is connected to one terminal of auxiliary winding 26 of the transformer via integrating resistor 25. The other terminal of auxiliary winding 26 is grounded. The cathode of diode 24 and one terminal of integrating capacitor 23 are connected to the base of the above transistor 22, respectively. The anode of diode 24 and the other terminal of integrating capacitor 23 are grounded, respectively.

Next, the operation of the load power detecting circuit with the above arrangement will be described.

In the circuit shown in FIG. 2, the voltage of auxiliary winding 26 is integrated by integrating resistor 25 and integrating capacitor 23 and generates triangular waves. The pulse width of this signal is detected with base-emitter voltage $V_{BE}$ across the base and emitter of transistor 22 as a threshold value. When the output power and the back electromotive force of auxiliary winding 26 are large, back electromotive force generation time $T_2$ and the crest value of the triangular wave increase and thereby transistor 22 conducts and current flows through load resistor 21. The larger back electromotive force causes transistor 22 to conduct better.

When the load power is low, back electromotive force generation time $T_2$ and the crest value of the triangular wave decrease and thereby transistor 22 opens and no load current flows. These operations allow the detection of load power at predetermined values.

The first embodiment is a circuit for detecting $Vo \times T_2$, and also serves as a circuit for detecting $T_2$ when Vo is constant. In a case where the winding phase of the transformer is opposite, $T_1 \times Vi$ can be detected; therefore, as seen from equation (5), predetermined load power can be detected in a similar manner regardless of the phase of auxiliary winding output for output power detection.

Thus, load power can be detected with any winding, regardless of primary and secondary windings, in any phase, in a similar manner. Even in a switching power supply with a primary winding only, load power can be detected.

Second Embodiment

Figure 3:
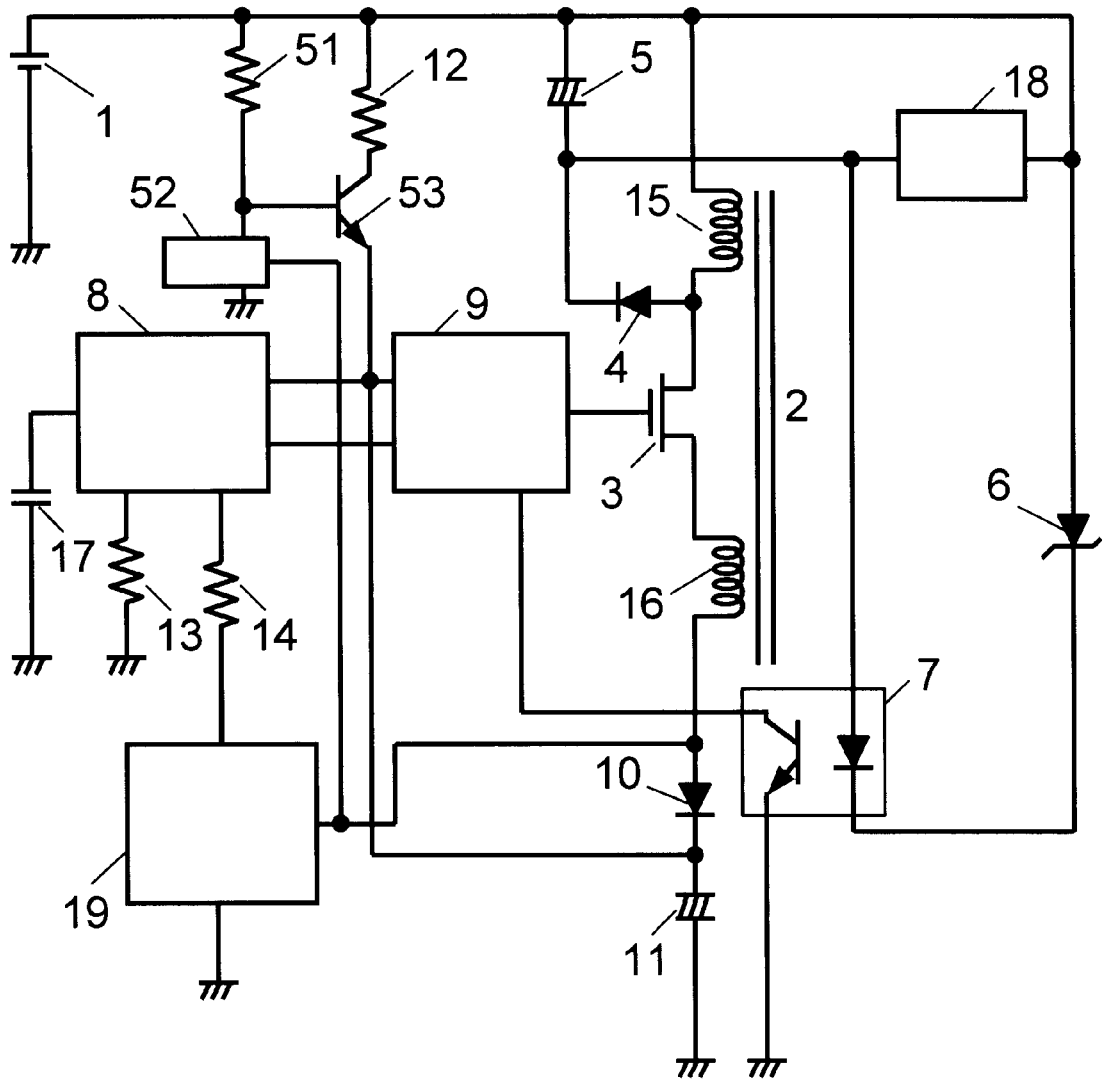
FIG. 3 shows a circuit diagram of a switching power supply in accordance with a second exemplary embodiment of the present invention.
Figure 6A:
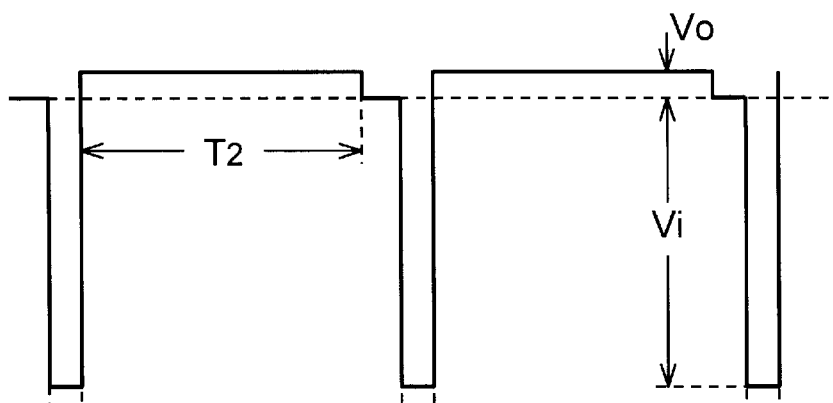
FIGS. 6A and 6B are waveforms showing the operation of the power supply.
Figure 6B:
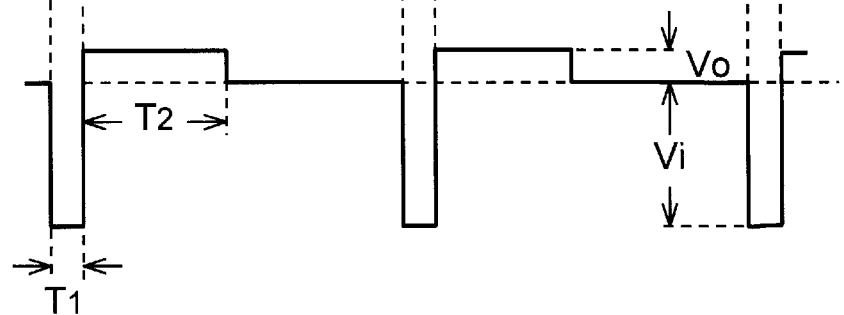
Figure 7A:
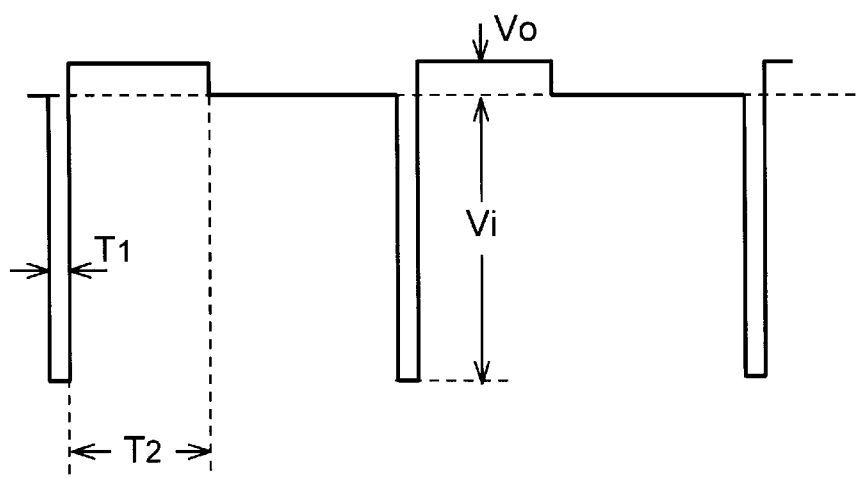
FIGS. 7A and 7B are waveforms showing the operation of the power supply.
Figure 7B:
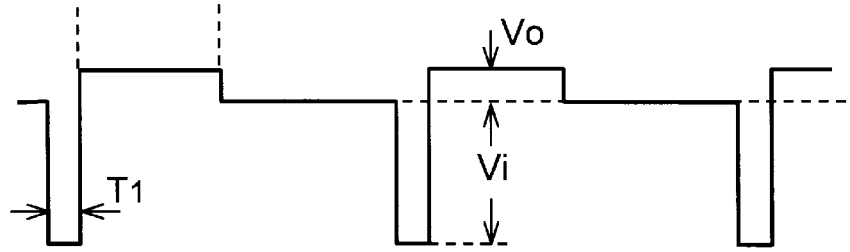

FIG. 3 shows a circuit diagram of a switching power supply in accordance with the second embodiment.

In the second embodiment, power reduction has been accomplished more effectively than that of the first embodiment.

In FIG. 3, the same reference numerals are given to the components similar to those shown in FIG. 1 for ease of explanation. The components added in FIG. 3 are starting resistor 51, start detection circuit 52, and transistor 53, i.e. a switch. The collector of transistor 53 is connected to power supply 1 via resistor 12. The base of transistor 53 is connected to power supply 1 via starting resistor 51 and also connected to start detecting circuit 52. The emitter of transistor 53 is connected to the node of frequency variable oscillation circuit 8 and PWM circuit 9, and also connected to the node of diode 10 and capacitor 11. Start detection circuit 52 is connected to load power detection circuit 19.

Next, the operation of a switching power supply with the above arrangement will be described.

When power supply 1 is turned on, transistor 53 is turned on via starting resistor 51. Then, supply voltage is supplied from power supply 1 via resistor 12. After the activation, voltage can be supplied from the node of diode 10 and capacitor 11 to continue the circuit operation and thus transistor 53 is turned off. At this moment, start detecting circuit 52 detects output pulses and lowers the voltage across the base of transistor 53 and turns off the transistor. Start detection circuit 52 can be configured Eke load power detection circuit 19. As mentioned above, a switching power supply of the second embodiment can interrupt the current flowing through resistor 12 after activation. This operation can prevent power loss and reduce power more effectively than that of the first embodiment.

Industrial Applicability

A switching power supply of this invention has a switching circuit for supplying a predetermined output voltage regardless of load variations and converting input voltages into the predetermined output voltage; a pulse width control circuit for controlling the switching circuit; a circuit for detecting load power; and an oscillation frequency variable oscillation circuit. This arrangement can change the switching frequencies and prevent a decrease in efficiency under low load.

What is claimed is:

1. A switching power supply for decreasing switching frequencies to a predetermined value by detecting pulse waveforms of an output transformer when load power is less than a predetermined value, and for performing pulse width control when said frequencies are lowered to the predetermined value or less.

2. The switching power supply described in claim 1 wherein load power is detected regardless of a phase of a winding of said output transformer.

* * * * *